United States Patent [19]
Weaver

[11] 3,943,032
[45] Mar. 9, 1976

[54] MINERAL WOOL INSULATION PRODUCT
[75] Inventor: Harold Lloyd Weaver, Port Allegany, Pa.
[73] Assignee: Pittsburgh Corning Corporation, Pittsburgh, Pa.
[22] Filed: May 23, 1974
[21] Appl. No.: 472,693

[52] U.S. Cl............................ 162/152; 162/181 D
[51] Int. Cl.² ....................................... D21F 11/00
[58] Field of Search................ 162/152, 145, 181 D; 106/71

[56] References Cited
UNITED STATES PATENTS

| | | | |
|---|---|---|---|
| 2,944,930 | 7/1960 | Bush et al. | 162/145 |
| 3,052,595 | 9/1962 | Pye | 162/181 D |
| 3,371,134 | 2/1968 | Ollinger | 106/71 |
| 3,510,394 | 5/1970 | Cadotte | 162/152 |
| 3,759,729 | 9/1973 | Fahn | 106/71 |

OTHER PUBLICATIONS

"The Dictionary of Paper", Amer. Paper & Pulp Assoc., (1951), p. 104.

*Primary Examiner*—S. Leon Bashore
*Assistant Examiner*—Peter Chin
*Attorney, Agent, or Firm*—Stanley J. Price, Jr.

[57] ABSTRACT

A mineral wool insulation product containing a major portion of mineral wool fibers, a conventional binder, and predetermined quantities of an admixture of selected colloidal mineral clays to provide an insulation product having extremely low quantities of free silica and excellent physical properties. The colloidal clay admixture comprises selected quantities of kaolinite clays and bentonite clays.

8 Claims, No Drawings

MINERAL WOOL INSULATION PRODUCT

BACKGROUND OF THE INVENTION

1. Field of the Invention

This invention relates to a mineral wool insulation product and more particularly to a mineral wool insulation product that is substantially free of crystalline silica.

2. Description of the Prior Art

In U.S. Pat. No. 3,470,062 there is disclosed a ceramic acoustical water-laid sheet in which mineral wool, Mississippi M&D clay and water are admixed to form a homogeneous slurry. A water-laid sheet is formed from the slurry containing between 20 per cent and 65 per cent by weight clay, between 35 per cent and 80 per cent by weight mineral wool and between 45 per cent and 75 per cent by weight water. The water-laid sheet is thereafter dried to remove the water and fired to 1,000° to 1,500°F to form a ceramic bonded board product.

It is known that mineral wool insulation product containing M&D clay comprise superior products from the standpoint of excellent physical characteristics. However, it has been found that the Mississippi M&D clay has about 13.6 per cent by weight free (uncombined) crystalline silica and when a dried product containing M&D clay is shaped or formed by sawing, grinding and the like, the free crystalline silica contained in the M&D clay is released into the atmosphere. Free crystalline silica may have deleterious effects to the health of those present when it is introduced into the atmosphere, constituting a silicosis-inducing work atmosphere.

There is a need for a mineral wool fiber insulation that has the desirable properties of a mineral wool fiber insulation containing M&D clay without the substantial quantities of free crystalline silica present in a product containing M&D clay.

SUMMARY OF THE INVENTION

The present invention provides a mineral wool insulation product comprising mineral wool fibers, an admixture of bentonite and kaolinite clays and a binder. Preferably, the mineral wool insulation product contains between about 10 per cent and 25 per cent by weight clay and most preferably about 15 per cent weight clay.

The clay is formed from an admixture of kaolinite clay and bentonite clay. The mineral wool insulation preferably contain between about 7 per cent and 14.0 per cent by weight kaolinite clay and between about 2 per cent and 6 per cent by weight bentonite clay. A most preferred composition of kaolinite clay and bentonite clay in mineral wool insulation compositions according to the invention is about 11.3 per cent by weight kaolinite clay and about 3.5 per cent by weight bentonite clay. The preferred insulation products have a density of between about 7 and 20 pounds per cubic foot. The flex strength (force required to break a one-inch-thick bar of material) of the mineral wool insulation product is preferably greater than about 50 pounds per square inch, and most preferably between 70 and 75 pounds per square inch. With the above admixture of kaolinite clay and bentonite clay the free silica present in the finished product is less than about 0.2 per cent by weight, which is well within the accepted standards.

The reason for the superiority, from the standpoint of free-silica content, of mineral wool insulation compositions according to the invention is not fully understood. It is known that M&D clay, which has proven to be a notoriously bad free-silica clay, comprises chemically a mixture of kaolinite and motmorillonite. The bentonite clays also comprises a large part of motmorillonite. In fact, all the clays here under discussion, that is M&D clays, bentonite clays, kaolinite clays, and motmorillonite clays are chemically similar and may be classed as hydrous silicates. Because of the similarity among the various clays here involved, the outstanding decrease in free-silica content in mineral wool insulation compositions according to the invention was not expected. Moreover, nor were the excellent physical characteristics obtained by use of an admixture of bentonite and kaolinite clays in compositions according to the invention.

Accordingly, the principal object of this invention is to provide a mineral wool insulation product having the desirable stength and density and being substantially free of free silica.

Another object of this invention is to provide a mineral wool insulation product that contains an admixture of colloidal clays having substantially the same properties as M&D clay without the undesirable property of substantial amounts of free silica being present in the finished product.

These and other objects and advantages of this invention will be more completely disclosed in the specification and as the following more description thereof proceeds.

DESCRIPTION OF THE PREFERRED EMBODIMENTS

In the vacuum forming process for making mineral products as described in co-pending application Ser. No. 417,976, file Nov. 21, 1973 for "A Process for Making a Shaped Fibrous Article by a Vacuum Forming Process and the Shaped Fibrous Article Made Thereby," a slurry containing about 3 per cent solids is circulated to a forming tank. The solids in the slurry may typically have the following composition:

| Constituents | Per cent by Weight |
|---|---|
| Mineral Fiber | 81 |
| Clay | 16 |
| Starch | 3 |
| Alumina | 0.6 |
| Flocculant | 0.01 |

The mineral wool fiber is preferably an inorganic fiber such as Texas Rock Wool formed from blast furnace slag. The clay previously used in this process was an M&D clay which is a natural ball clay and is a natural mineral mixture of kaolinite and montmorillonite. U.S. Pat. No. 3,470,062 enumerates the properties and composition of Mississippi M&D clay.

Conventional Starch is employed as a binder and colloidal alumina such as that sold by Continental Oil Company under the trademark "Dispal 'M'" serves as a binder and provides strength to the mineral wool insulation. A flocculant such as a high molecular weight acrylic polyelectrolyte aids in uniformly dispersing the fibers and other solids in the slurry. A suitable flocculant is sold by Hercules, Inc. under the trademark "Reten 421" and is defined as an anionic water soluble polymer.

The dilute slurry introduced into the forming tank is circulated toroidally therein and a foraminous mandrel having a cylindrical configuration is positioned in the forming tank. The mandrel is rotated in a direction opposite to the direction of circulation of the slurry and a vacuum is applied to the mandrel. Solids in the slurry accrete on the surface of the foraminous mandrel and the filtrate is withdrawn through the internal portion of the mandrel and circulated to a filtrate holding tank. After the layer of solids has attained a preselected thickness the mandrel is removed from the forming tank and the vacuum is continued on the mandrel until the water content of the cylindrically shaped layer of accreted solids is about 50 per cent by weight water.

Thereafter the outer surface of the cylindrical layer of accreted solids is trimmed to a preselected thickness by means of a bandsaw while in the wet condition. Thereafter a coating material, such as a finish coating, is sprayed on the outer surface of the cylindrically shaped layer while vacuum is being applied to the mandrel so that the coating material is drawn through the cylindrical layer of solids. Any suitable coating material may be employed. The cylindrically shaped member of accreted solids is removed from the mandrel and bake-dried at an elevated temperature until the water content is preferably less than one per cent by weight.

The dried product is a mineral wool insulation that preferably has a density of between about 12 to 13 psi and a flex strength of at least about 50 psi. The thermal conductivity of the mineral wool insulation at a mean temperature of about 500°F. is about 0.51 BTU/°F. Ft$^2$.In.hr. The cylindrical mineral wool insulation product is intended to be used as a pipe insulation and after drying the cylindrically shaped members are cut vertically to form two-simi-cylindrical sections that are positioned around the pipe. Further, the end portions of the cylindrically shaped members are trimmed after drying to provide preselected lengths of pipe insulation. At the job site frequently the semi-cylindrical sections of pipe convering are cut to fit different length sections of pipe.

Where M&D clay is employed as the clay constituent of the slurry the dried product has in excess of about 2.0 per cent by weight free crystalline silica. It has been discovered that selected admixtures of kaolinite clays and bentonite clays in relatively specific proportions can be substituted for the M&D clay and a mineral wool fiber insulation product having the above enumerated strength, density and thermal conductivity may be obtained. Both bentonite clays and kaolinite clays generally comprise naturally occurring colloidal clays. As hereabove stated both may be classed as hydrous silicates. Both kaolinite clays and bentonite clays are sold in various commercial grades and particle size ranges under varying trade designations as is well known by those in the industry.

A typical kaolinite clay useful in compositions of the invention comprises that clay supplied by the Georgia Kaolin Co. and designated Georgia Kaolin No. 6 Tile clay. That clay has the following typical physical and chemical characteristics, which are given by way of example.

| Analysis | Georgia Kaolin Co. No. 6 Tile Clay |
|---|---|
| Silicon dioxide | 46.9 |
| Aluminum oxide | 38.2 |
| Iron oxide | 0.35 |

-continued

| Analysis | Georgia Kaolin Co. No. 6 Tile Clay |
|---|---|
| Titanium dioxide | 1.42 |
| Calcium oxide | 0.43 |
| Magnesium oxide | 0.58 |
| Sodium oxide | 0.04 |
| Ignition loss at 1000°C | 13.9 |

| Typical Physical Properties: | Georgia Kaolin Co. No. 6 Tile Clay |
|---|---|
| Particle size, | |
| % 2 microns | 54% – 65% |
| Mean particle size | 1.0 – 1.3 microns |
| pH, 20% solids | 4.0 – 6.7 |
| 200 Mesh Screen Residue | 0.15 max. |
| 325 Mesh Screen Residue | 1.0 max. |
| Cone 10 Absorption | 5.0% |
| Moisture | 3% max. pulverize grade only |
| Color (Fired) Cone 8 | |
| 100% Clay - Brightness | 80.3% |
| - Whiteness index | 22.9% |
| Color (Fired) Cone 8 | |
| 50/50 Clay/Nepheline Syenite | |
| - Brightness | 60.8% |
| - Whiteness index | 25.9% |

Suitable bentonite clays found to be particularly useful in compositions of the invention comprise polymer-extended sodium bentonite and designated IMC SDG - 200 Bentonite and IMC SDG - 220 Bentonite. Bentonite clay is a hydrated aluminum silicate composed essentially of the clay mineral, montmorillonite and includes small quantities of feldspar, quartz, mica and selenite. A typical chemical composition of the bentonite clay before polymer extension is as follows:

| | | | |
|---|---|---|---|
| $SiO_2$ | 58.53% | $Na_2O$ | 1.68% |
| $Al_2O_3$ | 19.61 | $K_2O$ | 0.31 |
| $Fe_2O_3$ | 3.10 | $TiO_2$ | 0.12 |
| FeO | 0.13 | $H_2O+$ (Crystal Water) | 6.21 |
| MgO | 2.65 | $H_2O-$ | |
| CaO | 0.25 | (Absorbed Water) | 7.89 |

The typical dry size is as follows:
Min.80% thru 200 mesh (74 microns); Min. 50% thru 325 mesh (44 microns).

To the foregoing typical bentonite clay, a small amount, e.g. about 0.03% by weight, of sodium polyacrylate is added for polymer extension.

As a substitute for the M&D clay in the solids portion of an aqueous slurry, an admixture of kaolinite clay and bentonite clay, as above described, may be used in the following most preferred proportions:

| | Range |
|---|---|
| kaolinite clay | 7 – 11.6% |
| bentonite clay | 2 – 6.0% |

In a most preferred instance the compositions many comprise kaolinite clay and about 3.5% by weight bentonite clay.

The invention will be further understood by reference to the following examples.

EXAMPLE 1

A slurry containing about 3.7% solids was prepared in which the solids in the slurry had the following composition:

| Material | Per cent |
| --- | --- |
| Kentucky-Tennessee M&D Clay | 20.3 |
| Starch | 2.0 |
| Colloidal Alumina | 0.8 |
| Zinc Borate | 1.0 |
| Texas Rock Wool | 76.0 |

A shaped article was formed by accreting the solids in the slurry on a mandrel. The accreted solids were dried as previously described and samples of the product had the following physical properties.

| | |
| --- | --- |
| Density: | Between 12.9 and 13.2 lbs. |
| Flex Strength: | Between 76 and 96 psi |
| Compressive Strength at 10% Deflection: | Between 16.5 and 18.5 |
| Free Silica Content: | 2% by weight. |

| Material | Per cent |
| --- | --- |
| Mineral Wool | 75.2 |

A shaped article was formed by accreting the solids in the slurry on a mandrel. The accreted solids were dried as previously described and the product had the following physical properties.

| | |
| --- | --- |
| Density: | 13.2 lbs./cu.ft. |
| Flex Strength: | 60 psi |
| Compressive Strength: | 14.9 at 10% deflection |
| Free Silica: | 0.18% by weight. |

As illustrated in Table 1, various blends of kaolnite clays and bentonite clays were utilized to obtain a mineral wool insulation product with desirable physical properties and a reduced amount of free silica.

TABLE 1

Composition, Physical Properties and Free Silica Content of Mineral Fiber Insulation Produced with Various Blends of kaolinite and bentonite Clays

| Test No. | %Mineral Wool Fibers | Type Kaolinite Clay | %(1) Clay | Type Bentonite Clay | % Bentonite |
| --- | --- | --- | --- | --- | --- |
| 859 | 75.2 | Georgia Kaolin Co. No. 6 Tile Clay | 18.0 | IMC (4) SDG-220 | 2.0 |
| 864 | 75.8 | Georgia Kaolin Co. No. 6 Tile Clay | 17.2 | IMC SDG-220 | 3.0 |
| 863 | 75.2 | Huber Co. D-6 Kaolin | 17.0 | IMC SDG-220 | 3.0 |
| 886 | 73.7 | Georgia Kaolin Co. No. 6 Tile Clay | 17.5 | IMC SDG-220 | 4.0 |
| 885 | 73.7 | Georgia Kaolin Co. No. 6 Tile Clay | 16.5 | IMC SDG-220 | 5.0 |
| 846 | 75.2 | Georgia Kaolin Co. No. 6 Tile Clay | 12.5 | IMC BH-200 | 7.5 |
| 856 | 75.2 | Huber Co. D-6 Kaolin | 11.3 | IMC BH-200 | 8.8 |
| 852 | 75.2 | Georgia Kaolin Co. No. 6 Tile Clay | 11.3 | IMC BH-200 | 8.8 |
| 853 | 75.2 | Georgia Kaolin Co. No. 6 Tile Clay | 11.3 | Georgia Kaolin Co. K-4 | 8.8 |
| 931 | 75.1 | M & D Clay | 20.1 | — | — |

| Test No. | % Starch | %Colloidal Alumina | %Zinc Borate | %Flocculant(2) | Density (pcf) | Flex. St. (psi) | Comp. St. 10% Def. (psi) | %Free Silica(3) |
| --- | --- | --- | --- | --- | --- | --- | --- | --- |
| 859 | 3.0 | 0.8 | 1.0 | 0.03 | 13.9 | 68.4 | 19.7 | 0.12 |
| 864 | 3.0 | 0.0 | 1.0 | 0.03 | 13.1 | 65.0 | 13.8 | 0.18 |
| 863 | 3.0 | 0.8 | 1.0 | 0.03 | 12.8 | 56.5 | 14.0 | 0.18 |
| 886 | 3.0 | 0.8 | 1.0 | 0.03 | 14.4 | 93.2 | 17.7 | 0.24 |
| 885 | 3.0 | 0.8 | 1.0 | 0.03 | 14.1 | 96.5 | 21.7 | 0.29 |
| 846 | 3.0 | 0.8 | 1.0 | 0.03 | 14.2 | 74.8 | 20.9 | 0.60 |
| 856 | 3.0 | 0.8 | 1.0 | 0.03 | 13.9 | 81.0 | 23.8 | 0.70 |
| 852 | 3.0 | 0.8 | 1.0 | 0.03 | 13.6 | 78.2 | 20.9 | 0.70 |
| 853 | 3.0 | 0.8 | 1.0 | 0.03 | 14.0 | 76.0 | 20.6 | 0.54 |
| 931 | 3.0 | 0.8 | 1.0 | 0.06 | 13.8 | 71.5 | 18.9 | 2.73 |

1. % Clay - Does not include bentonite
2. % Flocculant = % of clay in batch
3. % Free silica in total product
4. % IMC is the International Minerals Corp.

EXAMPLE 2

A slurry containing about 3.7% solids was prepared with the solids of the batch having the following composition:

| Material | Per cent |
| --- | --- |
| No. 6 Tile Kaolin Clay | 17.0 |
| SDG - 220 Bentonite | 3.0 |
| Starch | 3.0 |
| Colloidal Alumina | .8 |
| Zinc Borate | 1.0 |

From the foregoing Table it can be seen that the use of bentonite/kaolinite clay admixtures according to compositions of the invention dramatically reduces the free-silica content of the product. At the same time, physical properties of the products are generally equal or superior to those of an insulation product prepared with M&D clay.

The following has described the invention and certain preferred embodiments thereof. It is to be expressly understood however, that the invention is not necessarily limited to the specific embodiments therein described, but may be variously practiced within the scope of the following claims.

What is claimed is:

1. A mineral wool insulation product comprising mineral wool fibers, a binder and an admixture of colloidal clays in an amount of about 10–25 per cent by weight of said product, said admixture of colloidal clays comprising kaolinite clay and bentonite clay, said mineral wool insulation product having a density of between 7 and 20 pounds per cubic foot and a free silica content of less tha 1.0 per cent by weight.

2. The mineral wool insulation product as set forth in claim 1 wherein said bentonite clay comprises about 2–6 per cent by weight of said product and about 0.03 per cent by weight polyacrylate admixed with said bentonite clay for polymer extension.

3. The mineral wool insulation product as set forth in claim 1 wherein said kaolinite clay comprises about 7–14 per cent by weight of said product.

4. The mineral wool insulation product as set forth in claim 1 wherein said kaolinite clay comprises about 11 per cent and said bentonite clay about 3.5 per cent by weight of said product.

5. The mineral wool insulation product as set forth in claim 1 wherein said bentonite clay comprises a polymer-extended bentonite clay and said mineral wool insulation product has a free silica content of less than about 0.2 per cent by weight.

6. The mineral wool insulation product as set forth in claim 1 wherein said product has a density of about 12–13 pounds per cubic foot.

7. The mineral wool insulation product as set forth in claim 6 wherein said product has a flex strength in excess of about 50 pounds per square inch.

8. The mineral wool insulation product as set forth in claim 7 wherein said product has a free silica content of less than about 0.2 per cent by weight.

* * * * *